United States Patent [19]

Takemura

[11] Patent Number: 4,839,734
[45] Date of Patent: Jun. 13, 1989

[54] SOLID-STATE IMAGING DEVICE HAVING HIGH-SPEED SHUTTER FUNCTION

[75] Inventor: Yasuo Takemura, Tokyo, Japan

[73] Assignee: Kabushiki Kaisha Toshiba, Kawasaki, Japan

[21] Appl. No.: 179,545

[22] Filed: Apr. 8, 1988

[30] Foreign Application Priority Data

Apr. 10, 1987 [JP] Japan .................................. 62-88175
Sep. 14, 1987 [JP] Japan ................................ 62-230009

[51] Int. Cl.[4] ........................ H04N 3/14; H04N 5/335
[52] U.S. Cl. .......................... 358/213.22; 358/213.25; 358/213.26; 358/213.29; 358/909
[58] Field of Search ...................... 358/213.26, 213.27, 358/213.29, 213.22, 213.25, 909, 212, 167, 166, 168, 163, 336, 213.15, 213.19; 250/578; 364/200

[56] References Cited

U.S. PATENT DOCUMENTS

| 4,180,854 | 12/1979 | Walden et al. | 364/200 |
|---|---|---|---|
| 4,539,596 | 9/1985 | Elabd | 358/213.26 |
| 4,598,321 | 7/1986 | Elabd et al. | 358/213.26 |
| 4,603,354 | 7/1986 | Hashimoto et al. | 358/213.25 |

FOREIGN PATENT DOCUMENTS

| 57-104377 | 6/1982 | Japan . |
| 58-121873 | 7/1983 | Japan . |
| 59-80069 | 5/1984 | Japan . |
| 59-181878 | 10/1984 | Japan . |

OTHER PUBLICATIONS

Kuroda et al., A New Configuration of CCD Imager with a Very Low Smear Level, 12/1981, pp. 319-320, Electronic Device Letters, vol. EDL-2, No. 12.

Japanese Article, Horii et al., FIT-CCD Image Sensor, Semiconductor Laboratory, Matsushita Electronics Corp., ITEJ Technical Report, vol. 10, No. 52, pp. 19-24. Feb./1987.

Primary Examiner—Jin F. Ng
Assistant Examiner—Mehdi Haghani
Attorney, Agent, or Firm—Cushman, Darby & Cushman

[57] ABSTRACT

Storage charges held in a photosensitive section of a CCD, serving as a solid-state imaging device, are simultaneously transferred to a high-speed transfer section, in response to a field shift pulse from a driver. The high-speed transfer section then transfers the charges to a field memory, in unit of lines and at a high speed. The field memory includes first and second memory arrays each having a one-field memory capacity and corresponding to a high-speed transfer array in the high-speed transfer section. Charges from each high-speed transfer array are alternately transferred to the first and second field memory arrays by a gate controlled by gate pulses supplied from the driver. The charges stored in the first field memory array are read out and transferred by a line transfer section, in units of lines, thereby obtaining a video signal of an odd-numbered field. Thereafter, the charges stored in the second field memory array are read out and transferred by the line transfer section, in units of lines, thereby obtaining a video signal of an even-numbered field.

12 Claims, 6 Drawing Sheets

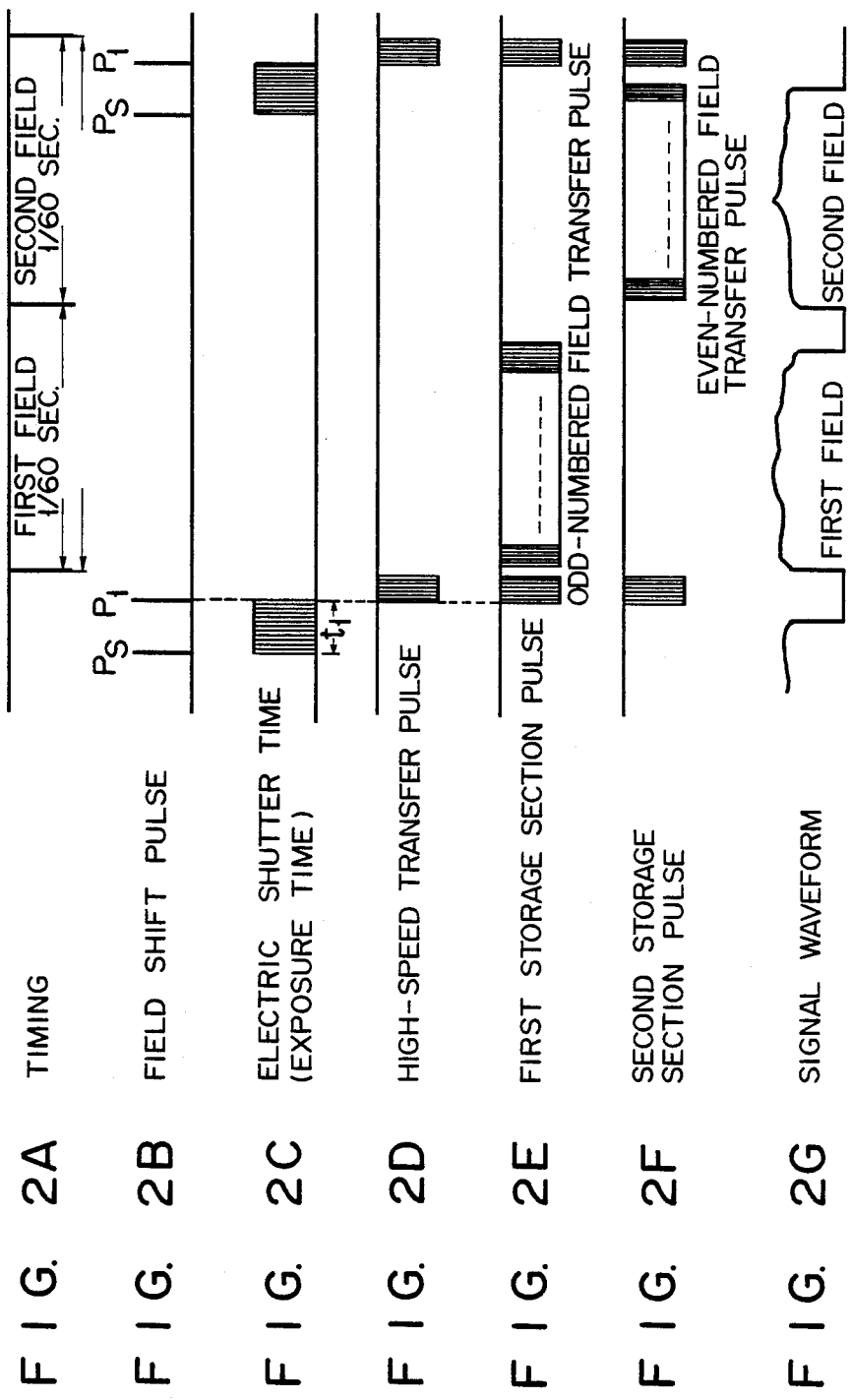

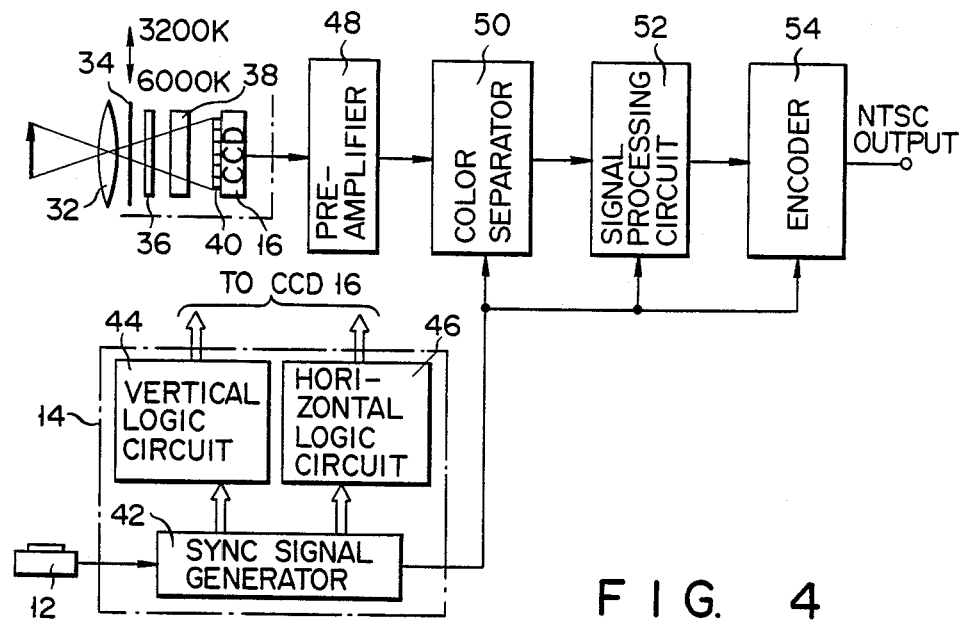
F I G. 4
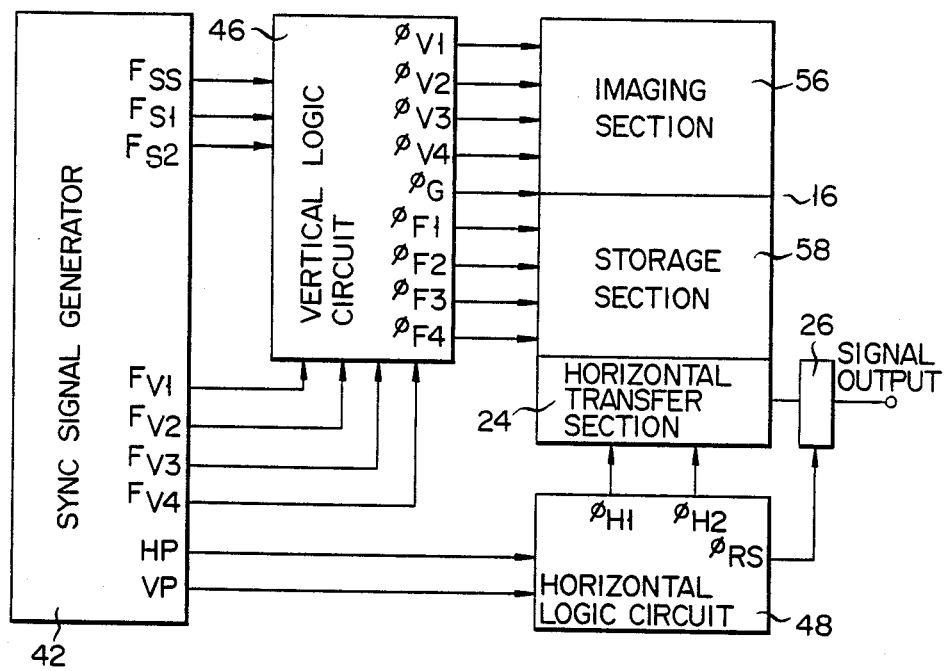
F I G. 5

FIG. 6A  φH1  

FIG. 6B  φH2  

FIG. 6C  φRS  

FIG. 6D  SIGNAL OUTPUT  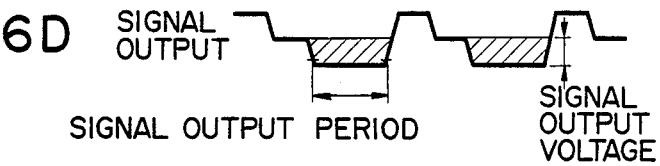

SIGNAL OUTPUT PERIOD       SIGNAL OUTPUT VOLTAGE

| ODD-NUMBERED FIELD FOURTH LINE | EVEN-NUMBERED FIELD FOURTH LINE |
| ODD-NUMBERED FIELD THIRD LINE | EVEN-NUMBERED FIELD THIRD LINE |
| ODD-NUMBERED FIELD SECOND LINE | EVEN-NUMBERED FIELD SECOND LINE |
| ODD-NUMBERED FIELD FIRST LINE | EVEN-NUMBERED FIELD FIRST LINE |

| ODD-NUMBERED FIELD THIRD LINE | ODD-NUMBERED FIELD 134TH LINE |
| EVEN-NUMBERED FIELD SECOND LINE | EVEN-NUMBERED FIELD 133RD LINE |
| ODD-NUMBERED FIELD SECOND LINE | ODD-NUMBERED FIELD 133RD LINE |
| EVEN-NUMBERED FIELD FIRST LINE | EVEN-NUMBERED FIELD 132ND LINE |
| ODD-NUMBERED FIELD FIRST LINE | ODD-NUMBERED FIELD 132ND LINE |

SOLID-STATE IMAGING DEVICE HAVING HIGH-SPEED SHUTTER FUNCTION

BACKGROUND OF THE INVENTION

1. Field of the Invention

The present invention relates to a solid-state imaging device such as a charge-coupled device (CCD) and, more particularly, to a solid-state imaging device having a high-speed shutter function.

2. Description of the Related Art

A solid-state imaging device such as a CCD is a comparatively recent development, and a color video camera incorporating this device is now commercially available. In this color video camera, the charge storage time of the photosensitive section of the device corresponds to the shutter time of a still photography camera, and is normally set to 1/60 sec.

In the meantime, however, a frame interline transfer (FIT) type CCD has been developed, which allows arbitrary selection of the shutter speed. A typical FIT type CCD comprises photosensitive and high-speed vertical transfer sections which constitute an imaging section, a field memory which serves as a storage section, and a horizontal transfer section. This type of CCD operates in the following manner:

(a) Charges stored in the photosensitive section are simultaneously transferred to the high-speed transfer section in response to a discharge field shift pulse supplied from a driver. A high-speed clock pulse is then supplied from the driver to the high-speed transfer section, and the charges are discharged at a high speed.

(b) Next, charges stored in the photosensitive section are simultaneously transferred to the high-speed transfer section in response to a signal read field shift pulse supplied from the driver, and are then transferred to the field memory in units of lines and at a high speed. Thereafter, the charges in the field memory are transferred to the horizontal transfer section, again in units of lines but at a normal television frequency, where they are then read within one horizontal period.

Thus, according to the conventional FIT type CCD, the charges in the photosensitive section are shifted in response to the discharge field shift pulse, after which the charges read in response to the signal read field shift pulse are stored in the storage section. Therefore, the time interval between the discharge and signal read field shift pulses constitutes the shutter speed. By selecting this time interval, a specified shutter speed can be set.

In the conventional video camera using the FIT type CCD, a one-field image can be obtained by a high-speed shutter operation. However, if a two-field (i.e., one-frame) image constituted by odd- and even-numbered fields is obtained so as to improve the vertical resolution, two shutter operations are required. If two shutter operations are performed in the above-described camera, the time interval between first and second shutter operations is 1/60 sec. Accordingly, although the one-field image can be obtained by the high-speed operation, the one-frame image corresponds to an image obtained by repeating the high-speed operation twice at a time interval of 1/60 sec. Therefore, when the motion of an object to be imaged is fast, flicker is caused and the resultant image becomes poor.

SUMMARY OF THE INVENTION

It is therefore an object of the present invention to provide a solid-state imaging device the shutter of which can operate at high speed, so that one-frame images of excellent vertical resolution can be obtained, which are free from flicker even when the object being imaged is in rapid motion, and which can provide an image signal of excellent quality without causing differences in signal level between fields.

A solid-state imaging device having a high-speed shutter function according to the present invention comprises:

a photosensitive section for storing charges corresponding to an amount of received light and a period of time during which the light is received;

a vertical transfer section to which the storage charges in the photosensitive section are simultaneously transferred in response to a field shift pulse, the vertical transfer section vertically transferring the transferred charges in units of lines and at a high speed;

first field memory means, having a one-field storage capacity for storing charges transferred from the vertical transfer section;

second field memory means, having a one-field storage capacity for storing charges transferred from the vertical transfer section;

transfer means for alternately transferring, in units of lines, the charges transferred from the vertical transfer section to the first and second field memory means;

read means for reading out the charges stored in the first field memory means and reading out the charges stored in the second field memory means; and a horizontal transfer section for horizontally transferring, in units of lines, the charges read out by the read means.

BRIEF DESCRIPTION OF THE DRAWINGS

FIGS. 2A to 2G are timing charts for explaining operations of the solid-state imaging device and its driver, as shown in FIG. 1;

FIG. 4 is a view showing an arrangement of a color video camera in which the embodiment of the present invention is incorporated;

FIG. 5 is a block diagram of the driver;

FIGS. 6A to 6D are timing charts for explaining an operation of a horizontal logic circuit contained in the driver;

FIGS. 8A and 8B are views respectively showing examples of writing signals in a storage section, for explaining an operation of still another embodiment.

DETAILED DESCRIPTION OF THE PREFERRED EMBODIMENTS

Figure 1:
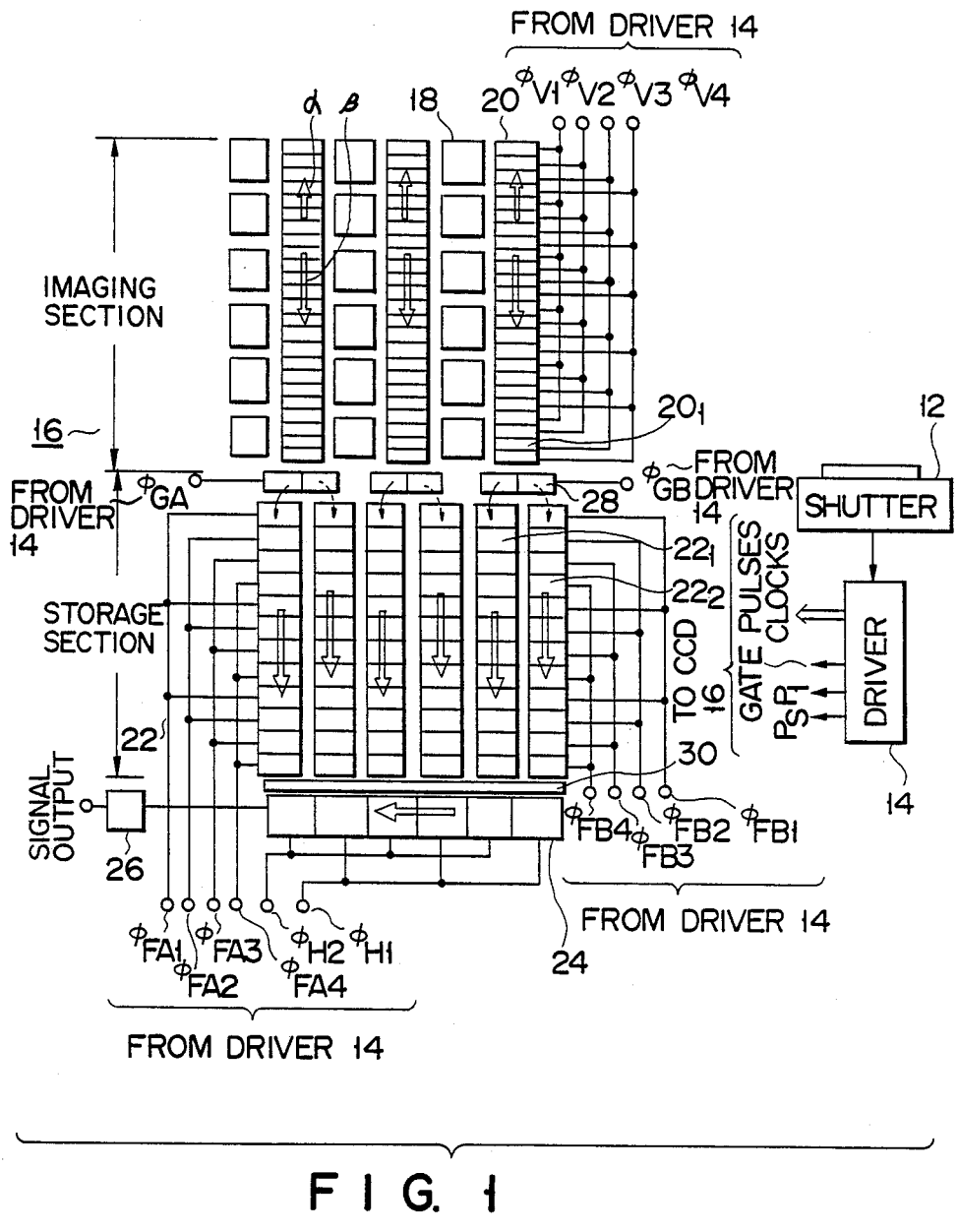
FIG. 1 is a view showing an arrangement of a solid-state imaging device having a high-speed shutter function according to an embodiment of the present invention, together with its driver.

FIG. 1 shows an arrangement of an embodiment of the present invention, and FIGS. 2A to 2G are timing charts for explaining an operation thereof. When photographic shutter 12 is operated, driver 14 successively generates discharge field shift pulse $P_s$ and signal read field shift pulse $P_I$ for every photographing operation, and supplies them to CCD 16 which serves as a solid-state imaging device. CCD 16 comprises photosensitive section 18 which is constituted by, for example, 500 vertical and 400 horizontal pixels (photodiodes), and high-speed transfer section 20 whose arrays are arranged in a vertical direction so as to be adjacent to respective vertical arrays of photosensitive section 18. Photosensitive section 18 and high-speed transfer section 20 together constitute an imaging section. High-speed transfer section 20 is made up of 500×4 stages, so that four times the number of vertical pixels, i.e, signals of 500 pixels, can be transferred without the signals becoming mixed.

The time interval between discharge field shift pulse $P_s$ and signal read field shift pulse $P_s$ is known as the electronic shutter operation time (exposure time). CCD 16 is of an interline transfer type and is periodically driven by a vertical blanking pulse when in a normal operation mode. CCD 16 comprises frame memory 22 which serves as a storage section, horizontal transfer section 24, output circuit 26, and gate sections 28 and 30 other than photosensitive section 18 and high-speed transfer section 20 as the imaging section.

In response to first discharge field shift pulse $P_s$, a gate (not shown) arranged between photosensitive section 18 and high-speed transfer section 20 is enabled, whereupon storage charges in photosensitive section 18 are simultaneously transferred to high-speed transfer section 20. Thereafter, the charges in high-speed transfer section 20 are discharged upward, in the direction indicated by arrow $\alpha$ in FIG. 1, this taking place at high speed during period $t_1$, and in accordance with clocks supplied from driver 14. During this period, charges are stored in photosensitive section 18.

Subsequently, signal read field shift pulse $P_I$ is output from driver 14, in response to which the storage charges in photosensitive section 18 are transferred to high-speed transfer section 20. Then, the charges in high-speed transfer section 20 are transferred downward, in the direction indicated by arrow $\beta$ in FIG. 1, i.e., to frame memory 22 serving as a storage section, at high speed and in accordance with clocks supplied from driver 14. In this instance, it is apparent that charges of each pair of adjacent vertical pixels are neither added nor read.

In this case, the charges in high-speed transfer section 20 are transferred to frame memory 22 in units of lines. This transfer means has the following characteristics. One high-speed transfer array $20_1$ will be exemplified. Charges in high-speed transfer array $20_1$ are separately and alternately transferred, in units of lines, to two memory arrays $22_1$ and $22_2$, in accordance with a high-speed transfer pulse (FIG. 2D) and gate pulses ($\phi_{GA}$ and $\phi_{GB}$) As a result, high-speed transfer array $20_1$, and memory arrays $22_1$ and $22_2$ store charges corresponding to two fields. In addition, gate section 28 is arranged between high-speed transfer array $20_1$, and memory arrays $22_1$ and $22_2$ to perform sorting of the charges. Gate section 28 is controlled by gate pulses ($\phi_{GA}$ and $\phi_{GB}$) from driver 14.

The above operation will now be described in detail, with reference to timing charts of clocks shown in FIGS. 3A to 3D.

Figure 3A:
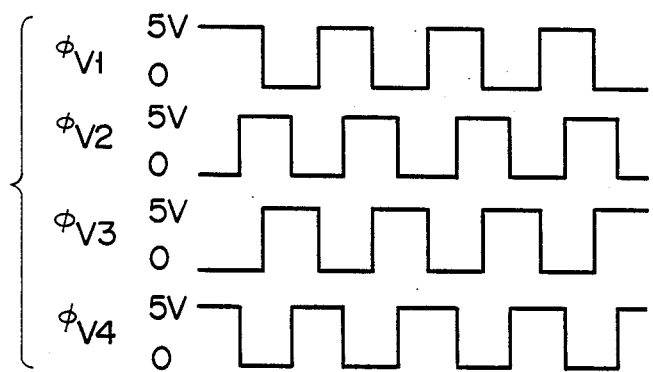
FIGS. 3A to 3D are timing charts of various pulses output from the driver shown in FIG. 1.

Referring to FIG. 3A, driver 14 supplies a four-phase pulse ($\phi_{V1}$, $\phi_{V2}$, $\phi_{V3}$, and $\phi_{V4}$) waveform having a frequency of 1.58 MHz to high-speed transfer section 20 of the imaging section. Signal charges are sequentially transferred to an electrode to which a voltage of +5 V is applied and shifted in a downward direction as indicated by arrow $\beta$ in FIG. 1.

Figure 3B:
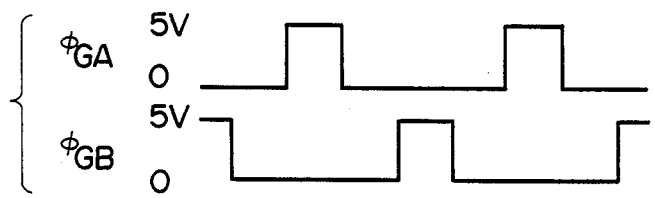

A two-phase pulse ($\phi_{GA}$ and $\phi_{GB}$) shown in FIG. 3B is supplied from driver 14 to gate section 28. Then, gate section 28 is alternately operated as a switch, in accordance with the phase of clock pulse $\phi_{V4}$. More specifically, when +5 V is applied to gate pulse $\phi_{GA}$, signal charges are distributed to memory array $22_1$, and when +5 V is applied to gate pulse $\phi_{GB}$, signal charges are distributed to memory array $22_2$.

The signal charges transferred to memory arrays $22_1$ and $22_2$ are transferred in the downward direction (indicated by arrow $\beta$) in accordance with pulses having $\frac{1}{2}$ frequency of high-speed transfer section 20, i.e., four-phase pulses ($\phi_{FA1}$, $\phi_{FA2}$, $\phi_{FA3}$, and $\phi_{FA4}$; and $\phi_{FB1}$, $\phi_{FB2}$, $\phi_{FB3}$, and $\phi_{FB4}$) having a frequency of 0.79 MHz.

Thus, the signal charges corresponding to 500 pixels, which are temporarily stored in high-speed transfer section 20, are stored in memory arrays $22_1$ and $22_2$ in the storage section in units of 250 pixels, respectively.

Figure 3C:
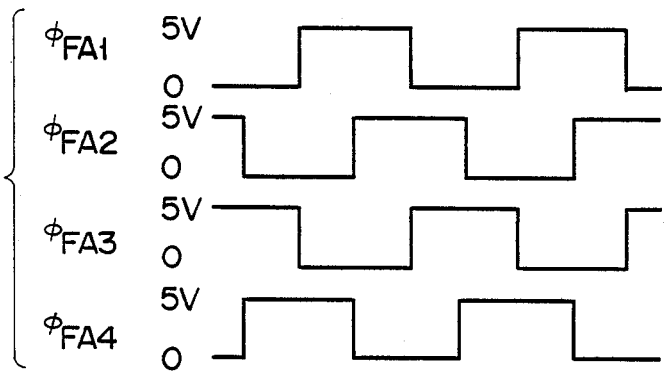
Figure 3D:
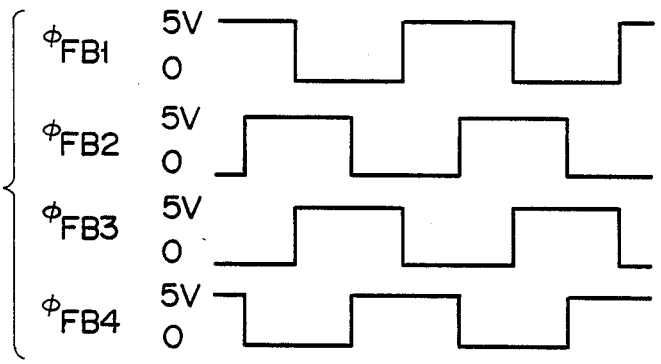

As shown in FIGS. 3C and 3D, the pulse waveforms applied to memory arrays $22_1$ and $22_2$ coincide with each other in the following pairs: pulse waveforms $\phi_{FA1}$ and $\phi_{FB3}$, pulse waveforms $\phi_{FA2}$ and $\phi_{FB4}$, pulse waveforms $\phi_{FA3}$ and $\phi_{FB1}$, and pulse waveforms $\phi_{FA4}$ and $\phi_{FB2}$. Therefore, if wirings are arranged inside CCD 16 in accordance with the coincidence of the pulses, external signals need not be independently supplied to terminals $\phi_{FA}$ and $\phi_{FB}$, and hence the number of wirings can be reduced.

Although only one high-speed transfer array $20_1$ is exemplified, the same relationship as that described with reference to high-speed transfer array $20_1$ is established between each of other high-speed transfer arrays and a corresponding one of the memory arrays.

With the above operation, an image signal corresponding to one frame is stored in frame memory 22 by a single shutter operation. This image signal is read in units of fields through gate section 30, horizontal transfer section 24, and output circuit 26. FIGS. 2E and 2F respectively show periods when signals of first and second fields are transferred. FIGS. 2G shows a signal waveform output from output circuit 26

The image obtained in this manner is constituted by a signal of a first field (odd) and a signal of a second field (even). Both the signals are obtained in the same shutter period. As a result, in a video camera using CCD 16 described above, the vertical resolution can be improved, and moreover flicker due to a time lag between the fields can be prevented. A shutter time, i.e., a shutter speed can be arbitrarily set by adjusting the time interval (exposure time) between field shift pulses $P_s$ and $P_1$.

FIG. 4 shows an arrangement of a color video camera using a solid-state imaging device according to the present invention. Light passing through zoom lens 32 of 3× magnification is focused onto the imaging section in CCD 16 serving as a solid-state imaging device with color filter array 40 through color temperature converting filter 34, color correction filter 36, and optical low-pass filter (LPF) 38.

Driver 14 includes sync signal generator 42, vertical logic circuit 44, and horizontal logic circuit 46. Vertical and horizontal logic circuits 44 and 46 generate various pulses necessary for the operation of CCD 16 using various pulses from sync signal generator 42, and supply the resultant pulses to CCD 16.

An output signal from CCD 16 is amplified by preamplifier 48, and then separated into the three primary color signals, namely the red (R), green (G), and blue (B) signals, by color separator 50. These primary color signals are subjected to signal processing required for a normal color camera such as gamma correction and white clip in signal processing circuit 52, and then supplied to encoder 54. Encoder 54 generates luminance and chrominance signals from the input signals, and mixes them to generate and output a standard NTSC signal.

A method of driving CCD 16 will be described with reference to FIG. 5. Sync signal generator 42 generates timing pulses ($F_{Ss}$, $F_{S1}$, $F_{S2}$, $F_{V1}$, $F_{V2}$, $F_{V3}$, $F_{V4}$, HP, and VP) necessary for the vertical and horizontal drives, and supplies them to vertical and horizontal logic circuits 46 and 48. Vertical logic circuit 46 generates each pulse waveform ($\phi_{V1}$, $\phi_{V2}$, $\phi_{V3}$, $\phi_{V4}$, $\phi_{F1}$, $\phi_{F2}$, $\phi F3$, and $\phi_{F4}$) necessary for vertical transfer operations in imaging and storage sections 56 and 58 in CCD 16. Horizontal logic circuit 48 generate each waveform ($\phi_{H1}$, $\phi_{H2}$, and $\phi_{RS}$) necessary for horizontal transfer. The waveforms necessary for horizontal transfer are two-phase drive waveforms ($\phi_{H1}$ and $\phi_{H2}$) shown in FIGS. 6A and 6B, and a reset pulse waveform ($\phi_{RS}$) shown in FIG. 6C to be supplied to output circuit 26. By supplying these pulse waveforms to horizontal transfer section 24 and output circuit 26, signals come downward from storage section 58 in units of lines and are horizontally transferred and a signal waveform shown in FIG. 6D can be obtained from output circuit 26.

Note that the discharge period of unnecessary charges and the transfer period of signals are present in imaging section 56. The phases of four-phase waveforms change in these periods. This determines a transfer direction, i.e., either of the upward and downward directions indicated by arrows α and β in FIG. 1. More specifically, in the discharge period of unnecessary charges, the timing of applying a voltage of 5 V from vertical logic circuit 46 is sequentially shifted in the following order: $\phi_{V4} \rightarrow \phi_{V3} \rightarrow \phi V2 \rightarrow \phi_{V1}$. Therefore, unnecessary charges are shifted in a direction corresponding to the above order, i.e., the upward direction, and are discharged. A drain section is normally arranged in the uppermost end of imaging section 56 so that charges shifted to the drain section are eliminated. On the other hand, as shown in FIG. 3A, in the transfer period of signals, the timing of applying a voltage of 5 V is shifted in the following order: $\phi_{V1} \rightarrow \phi_{V2} \rightarrow \phi_{V3} \rightarrow \phi_{V4}$. Therefore, the signal charges are shifted in a direction corresponding to the above order, and hence the signals are shifted from imaging section 56 to storage section 58.

In imaging section 56, when the signals are transferred from photosensitive section 18 to high-speed transfer section 20 at a high-speed, field shift pulses $P_s$ and $P_I$ are required. These field shift pulses are supplied from vertical logic circuit 4 to imaging section 56 by superposing them on pulse waveforms $\phi_{V1}$ and $\phi_{V3}$ without arranging another gate.

As described above, according to the present invention, a high-speed shutter operation can be performed, and a one-frame image having an excellent vertical resolution can be obtained. When a signal for a still picture is obtained using a normal video camera, if an object moves, flicker is caused because a shutter is closed at an interval of 1/60 sec between odd- and even-numbered fields. For this reason, a complete one-frame image cannot be obtained. However, according to the present invention, even if the motion of an object is fast, a still image with an excellent vertical resolution can be obtained. In addition, even if a variable-speed shutter is employed, a one-frame still image can be obtained at an arbitrary speed. Since the exposure time in odd- and even-numbered fields remains the same, no difference in signal level is caused in the to fields, thereby obtaining an image signal with excellent quality.

In recent display apparatuses, a non-interlace type (sequential scanning) capable of improving image quality has been used as well as an interlace type. The non-interlace type display apparatus requires an input image signal for a non-interlace operation. In addition, a hard copy apparatus has been recently developed, which allows an image signal to be copied on a photosensitive sheet. The image signal for the non-interlace operation is preferably used as an image signal to be supplied to such an apparatus so as to improve image quality. Therefore, the solid-state imaging device and its driver having above-described arrangements may be improved so as to obtain such a non-interlace image signal.

Figure 7:
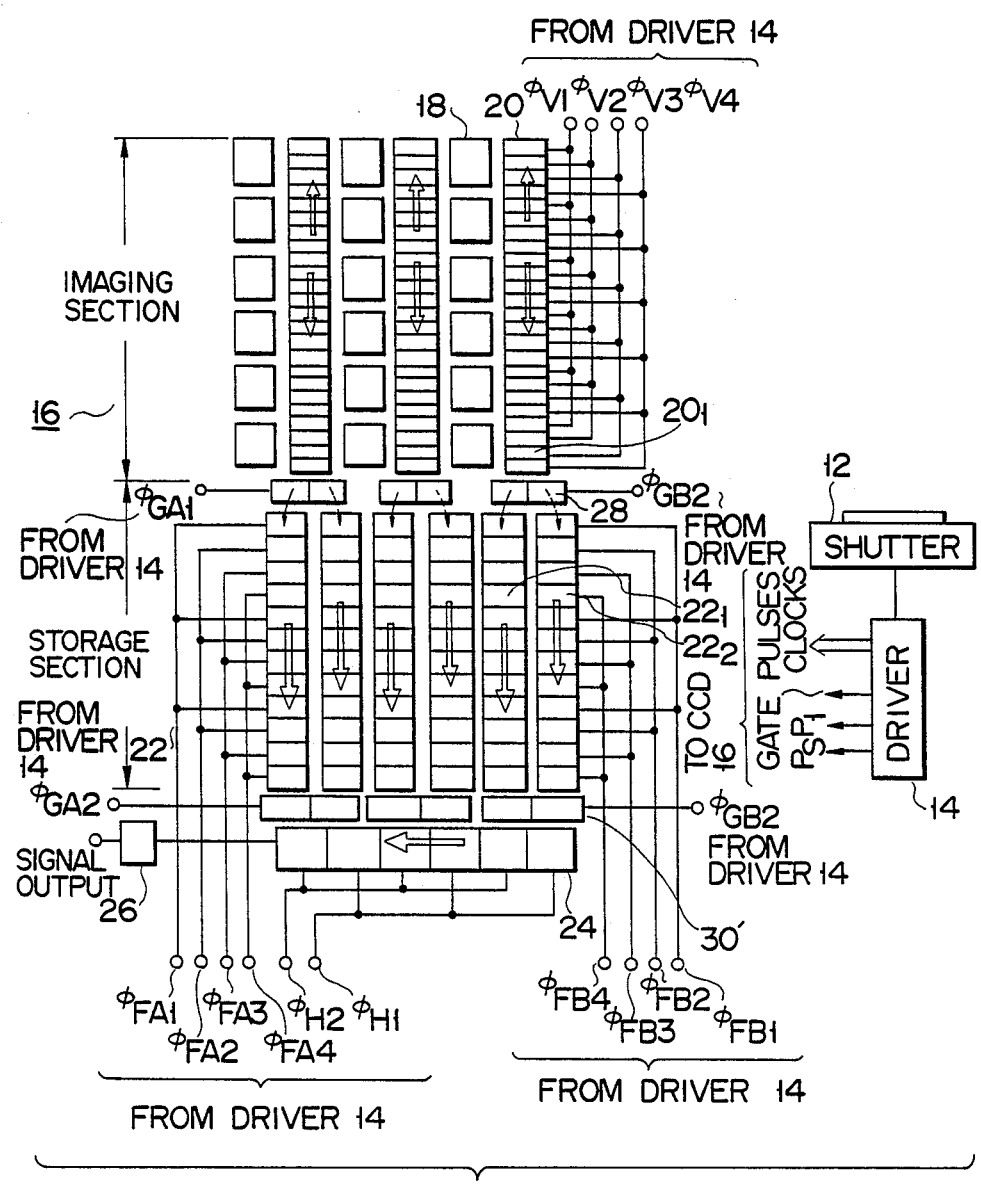
FIG. 7 is a view showing an arrangement of a solid-state imaging device according to another embodiment of the present invention, together with its driver.

FIG. 7 shows an arrangement of another embodiment in such a case. In this embodiment, the operation mode of gate section 30' is switched from the interlace mode to the non-interlace mode in accordance with gate pulses ($\phi_{GA2}$ and $\phi_{GB2}$) from driver 14. For example, when an interline type output image signal is to be obtained, gate section 30' is controlled so as to read out an image signal from frame memory 22 in units of fields, as described above. When a non-interline type output image signal is to be obtained, gate section 30' is controlled so as to alternately read out even- and odd-field signals stored in frame memory 22 in units of lines. The gate pulses ($\phi_{GA2}$ and $\phi_{GB2}$) used in this case are the same as those used to control gate section in the previous embodiment. The operation mode of gate section 30' is switched in accordance with the read signals can be obtained, which are suitable for both interlace type and non-interlace type cathode-ray tubes. In addition, the embodiment is effective in obtaining a hard copy having excellent image quality.

The present invention is not limited the above-described embodiments. For example, as shown in FIGS. 8A and 8B, gate section 28 on the write side is controlled such that an image signal of each line is stored. FIG. 8A shows the state of line signals written in the above manner. In this case, image signals are alternately written in first and second field memories 60 and 62 in units of lines. FIG. 8B shows a case wherein line signals of odd- and even-numbered fields are written in first field memory 60 in a non-interlace manner until first field memory 60 is filled, and then line signals of the odd- and even-numbered fields are sequentially written in second field memory 62. Interline and non-interline type output image signals can be obtained in such a manner.

As has been described above, according to the present invention, a high-speed shutter operation can be performed, and a one-frame image having an excellent vertical resolution can be obtained. When a signal for a still picture is obtained using a normal video camera, if an object moves, flicker is caused because a shutter is closed at an interval of 1/60 sec between odd- and even-numbered fields. For this reason, a complete one-frame image cannot be obtained. However, according to the present invention, even if the motion of an object is fast, a still image with an excellent vertical resolution can be obtained. In addition, even if a variable-speed shutter is employed, a one-frame still image can be obtained at an arbitrary speed. Since the exposure time in odd- and even-numbered fields remains the same, no difference in signal level is caused in the two fields, thereby obtaining an image signal with excellent quality. Moreover, by properly selecting the read mode, interlace and non-interlace type image signals can be selectively obtained, and hence the present invention provides excellent practical applications.

What is claimed is:

1. A solid-state imaging device having a highspeed shutter function, comprising:
   a photosensitive section for storing charges corresponding to an amount of received light and a period of time during which the light is received;
   a vertical transfer section to which the storage charges in said photosensitive section are simultaneously transferred in response to a field shift pulse, said vertical transfer section vertically transferring the transferred charges in units of lines and at a high speed;
   first field memory means, having a one-field storage capacity for storing charges transferred from said vertical transfer section;
   second field memory means, having a one-field storage capacity for storing charges transferred from said vertical transfer section;
   transfer means for alternately transferring, in units of lines, the charges transferred from said vertical transfer section to said first and second field memory means;
   read means for reading out the charges stored in said first field memory means and reading out the charges stored in said second field memory means; and
   a horizontal transfer section for horizontally transferring, in units of lines, the charges read out by said read means.

2. The solid-state imaging device according to claim 1, wherein the number of vertical pixels in each of said first and second field memory means is ½ that of vertical pixels in said photosensitive section.

3. The solid-state imaging device according to claim 1, wherein said transfer means includes gate means arranged between said vertical transfer section and said first field memory means, and between said vertical transfer section and said second field memory means, and control means for controlling an enabled/disabled state of said gate means.

4. The solid-state imaging device according to claim 3, wherein said control means includes driver means for generating the field shift pulse and drive pulses for driving said vertical transfer section to transfer the transferred charges to said gate means, in units of lines and at a high speed,
   said driver means being arranged to generate control pulses for causing said gate means to transfer the charges, which are transferred from said vertical transfer section in units of lines, to said first and second field memory means, and alternately supply the control pulses to said gate means between said vertical transfer section and said first field memory means, and said gate means between said vertical transfer section and said second field memory means.

5. The solid-state imaging device according to claim 1, wherein said read means alternately reads out the charges from said first and second field memory means.

6. The solid-state imaging device according to claim 5, wherein said read means comprises:
   first read means, for reading out the charges from said first field memory means and reading out the charges from said second field memory means;
   second read means, for alternately reading out the charges from said first and second field memory means; and
   read control means for selectively operating said first and second read means.

7. The solid-state imaging device according to claim 5, wherein said read means includes gate means arranged between said first field memory means and said horizontal transfer section, and between said second field memory means and said horizontal transfer section, and control means for controlling an enabled/disabled state of said gate means.

8. The solid-state imaging device according to claim 7, wherein said control means includes driver means for generating the field shift pulse,
   said driver means being arranged to generate control pulses for causing said gate means to transfer the charges from said first and second field memory means to said horizontal transfer section, and
   said driver means being arranged to
   (a) supply the control pulses to said gate means arranged between said first field memory means and said horizontal transfer section, and then supply the control pulses to said gate means arranged between said second field memory means and said horizontal transfer section when the charges are read out from said first field memory means, and then the charges are read out from said second field memory means, and
   (b) alternately supply the control pulses to said gate means between said first field memory means and said horizontal transfer section, and to said gate means between said second field memory means and said horizontal transfer section, when the charges are alternately read out from said first and second memory means.

9. The solid-state imaging device according to claim 1, wherein said transfer means transfers the charges, which are transferred in units of lines from said vertical transfer section, to said first field memory means until said first field memory means is filled, and thereafter transfers the charges to said second field memory means.

10. The solid-state imaging device according to claim 9, wherein said transfer means comprises:
    first transfer means, for transferring the charges to said first field memory means until said first field memory means is filled, thereafter transferring the charges to said second field memory means;
    second transfer means, for alternately transferring the charges to said first and second field memory means; and
    transfer control means for selectively operating said first and second transfer means.

11. The solid-state imaging device according to claim 9, wherein said transfer means includes gate means between said vertical transfer section and said first field memory means, and between said vertical transfer section and said second field memory means, and control means for controlling a enabled/disabled state of said gate means.

12. The solid-state imaging device according to claim 11, wherein said control means includes driver means for generating the field shift pulse and drive pulses for driving said vertical transfer section to transfer the transferred charges to said gate means, in units of lines and at a high speed, said driver means being arranged to generate control pulses for causing said gate means to transfer the charges, which are transferred in units of lines from said vertical transfer section, to said first and second field memory means, and said driver means being arranged to (a) supply the control pulses to said gate means arranged between said vertical transfer section and said first field memory means, and then supply the control pulses to said gate means arranged between said vertical transfer section and said second field memory means, when the charges are transferred to said first field memory means, until said first field memory means is filled, and thereafter transfer the charges to said second field memory means, and (b) alternately supply the control pulses to said gate means between said vertical transfer section and said first field memory means, and to said gate means between said vertical transfer section said second field memory means when the charges are alternately transferred to said first and second memory means.

* * * * *